United States Patent
Kitamura et al.

(10) Patent No.: US 11,529,686 B2
(45) Date of Patent: Dec. 20, 2022

(54) THREE-DIMENSIONAL POWDER BED FUSION ADDITIVE MANUFACTURING APPARATUS

(71) Applicant: JEOL Ltd., Tokyo (JP)

(72) Inventors: Shinichi Kitamura, Tokyo (JP); Nari Tsutagawa, Tokyo (JP)

(73) Assignee: JEOL Ltd., Tokyo (JP)

( * ) Notice: Subject to any disclaimer, the term of this patent is extended or adjusted under 35 U.S.C. 154(b) by 17 days.

(21) Appl. No.: 17/171,000

(22) Filed: Feb. 9, 2021

(65) Prior Publication Data

US 2021/0245254 A1    Aug. 12, 2021

(30) Foreign Application Priority Data

Feb. 10, 2020  (JP) .............................. JP2020-020310
Feb. 3, 2021   (JP) .............................. JP2021-15469

(51) Int. Cl.
*B22F 12/30*    (2021.01)
*B33Y 30/00*    (2015.01)
*B22F 10/28*    (2021.01)

(52) U.S. Cl.
CPC .............. *B22F 12/30* (2021.01); *B33Y 30/00* (2014.12); *B22F 10/28* (2021.01)

(58) Field of Classification Search
CPC ........... B22F 12/30; B22F 10/28; B33Y 30/00
See application file for complete search history.

(56) References Cited

U.S. PATENT DOCUMENTS

| | | | |
|---|---|---|---|
| 2013/0327917 A1* | 12/2013 | Steiner | G05B 19/4099 248/649 |
| 2015/0004045 A1 | 1/2015 | Ljungblad | |
| 2015/0210007 A1* | 7/2015 | Durand | B29C 64/118 425/150 |
| 2015/0343688 A1* | 12/2015 | Goodman | B33Y 10/00 264/129 |
| 2018/0079153 A1* | 3/2018 | Ng | B29C 64/209 |
| 2019/0308242 A1* | 10/2019 | Matsumoto | B22F 10/20 |
| 2021/0197284 A1* | 7/2021 | Mouri | B22F 12/13 |

FOREIGN PATENT DOCUMENTS

| | | | |
|---|---|---|---|
| CN | 105855547 A | | 8/2016 |
| CN | 107498046 B | | 4/2019 |
| JP | 2015183245 A | * | 10/2015 |
| JP | 2015183245 A | | 10/2015 |
| JP | 2016529389 A | | 9/2016 |

OTHER PUBLICATIONS

LayerShift XYZ https://layershift.xyz/kinematiccoupling/ (Year: 2019).*
NPL, Small Parts & Bearings (Year: 1997).*
Extended European Search Report issued in EP21152364.2 dated Jun. 15, 2021.

* cited by examiner

*Primary Examiner* — Timothy Kennedy
*Assistant Examiner* — Farah Taufiq
(74) *Attorney, Agent, or Firm* — The Webb Law Firm

(57) ABSTRACT

A three-dimensional powder bed fusion additive manufacturing (PBF-AM) apparatus includes a movement mechanism, a stage, a plurality of support columns, a base plate, and a shielding member. The base plate is supported by the plurality of support columns, and a powder material for forming a product is laminated on the base plate. The shielding member surrounds the plurality of support columns between the stage and the base plate.

17 Claims, 8 Drawing Sheets

ND POWDER BED
THREE-DIMENSIONAL POWDER BED FUSION ADDITIVE MANUFACTURING APPARATUS

CROSS-REFERENCE TO RELATED APPLICATIONS

This application claims priority to Japanese Patent Application Nos. 2020-020310 filed Feb. 10, 2020 and 2021-15469 filed Feb. 3, 2021, the disclosures of which are hereby incorporated by reference in their entirety.

BACKGROUND OF THE INVENTION

Field of the Invention

The present invention relates to a three-dimensional powder bed fusion additive manufacturing (PBF-AM) apparatus that manufactures a product by stacking layers in which a powder material is thinly spread on a stage one by one.

Description of Related Art

In recent years, a three-dimensional PBF-AM technology that manufactures a product by stacking layers in which a powder material is thinly spread one by one has attracted attention, and many types of three-dimensional PBF-AM technologies have been developed depending on different powder materials and different manufacturing methods.

In a manufacturing method using a conventional three-dimensional PBF-AM apparatus, for example, a powder material is spread layer by layer on a base plate installed on the upper surface of a stage. Next, in the powder material spread on the base plate, only the two-dimensional structural portion corresponding to one cross-section of a product is melted by a heating mechanism composed of an electron beam or a laser. Layers of the powder material are then stacked one by one in a height direction (a Z-direction), so that the product is manufactured (see, for example, JP 2016-529389 A).

Further, JP 2016-529389 A discloses a technology in which a start plate that indicates a base plate is installed via a powder material on a construction platform that moves vertically.

[Patent Literature 1] Japanese Patent Laid-Open No. 2016-529389

However, in the technology described in JP 2016-529389 A, a base plate is installed via a powder material on a stage. For this reason, in the technology described in JP 2016-529389 A, the heat of the base plate is transferred via the powder material to the stage, and the stage and a movement mechanism for moving the stage may be deformed by the heat.

SUMMARY OF THE INVENTION

In view of the above problem, an object of the present invention is to provide a three-dimensional PBF-AM apparatus that can suppress the heat transfer from a base plate to a stage.

In order to solve the above problem and achieve an object of the present invention, a three-dimensional powder bed fusion additive manufacturing (PBF-AM) apparatus according to the present invention includes a movement mechanism, a stage, a plurality of support columns, a base plate, and a shielding member. The stage is movably supported by the movement mechanism. The plurality of support columns are arranged on the stage. The base plate is supported by the plurality of support columns, and a powder material for forming a product is laminated on the base plate. The shielding member surrounds the plurality of support columns between the stage and the base plate.

In addition, another three-dimensional PBF-AM apparatus according to the present invention includes a movement mechanism, a stage, a plurality of support columns, and a base plate. The stage is movably supported by the movement mechanism. The plurality of support columns are arranged on the stage. The base plate is supported by the plurality of support columns, and a powder material for forming a product is laminated on the base plate.

A support groove is formed in a bottom surface of the base plate, the bottom surface being opposite to one surface on which a powder material is laminated. In addition, a support that makes point contact or line contact with the support groove is arranged on each of the plurality of support columns.

According to the three-dimensional PBF-AM apparatus of the present invention, it is possible to suppress the heat transfer from the base plate to the stage.

DESCRIPTION OF THE INVENTION

Figure 1:
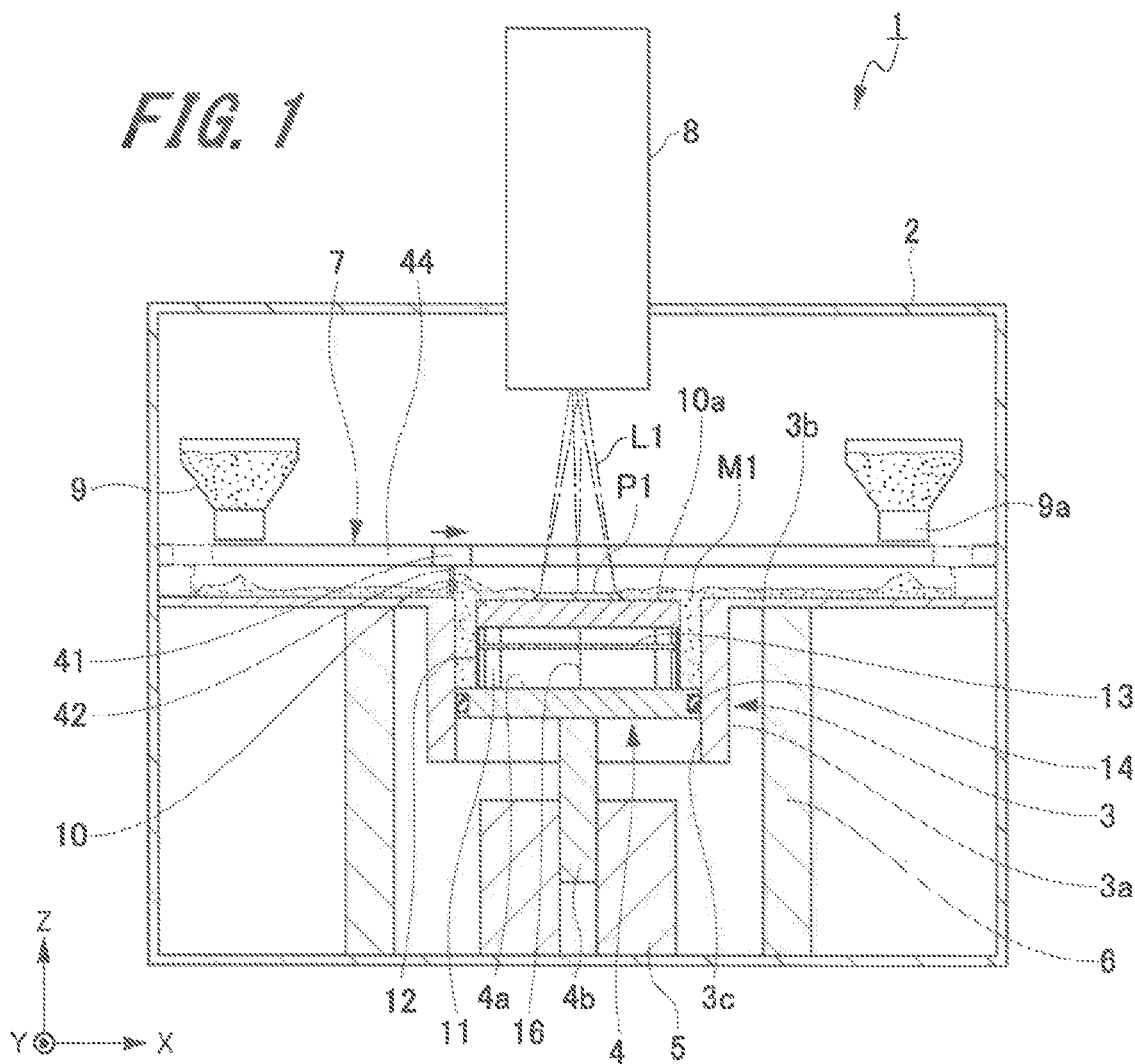
FIG. 1 is a schematic cross-sectional view schematically illustrating a three-dimensional PBF-AM apparatus according to an embodiment example of the present invention.

Hereinafter, embodiment examples of a three-dimensional PBF-AM apparatus according to the present invention will be described with reference to FIGS. 1 to 19. The same reference numerals are given to members common to the respective drawings.

1. Embodiment Example 1-1. Configuration of Three-Dimensional PBF-AM Apparatus First, a first embodiment example of a three-dimensional PBF-AM apparatus according to an embodiment example of the present invention (hereinafter, referred to as "the present example") will be described with reference to FIG. 1.

FIG. 1 is a schematic cross-sectional view schematically illustrating the three-dimensional PBF-AM apparatus of the present example.

A three-dimensional PBF-AM apparatus 1 illustrated in FIG. 1 is, for example, an apparatus that irradiates a powder material made of metal powder such as titanium, aluminum, and iron with an electron beam to melt the powder material and stacks layers in which the powder material is solidified, thereby manufacturing a three-dimensional product.

As illustrated in FIG. 1, the three-dimensional PBF-AM apparatus 1 includes a hollow processing chamber 2, a build box 3, a stage 4 with a flat plate shape, a stage drive mechanism 5, a support base 6, a powder supply mechanism 7, an electron gun 8, a powder tank 9, and a base plate 10. Further, the three-dimensional PBF-AM apparatus 1 also includes a support column 11 that supports the base plate 10 and a shielding member 12.

Here, the direction parallel to one surface 4a of the stage 4 is defined as a first direction X, and the direction that is orthogonal to the first direction X and parallel to the one surface 4a of the stage 4 is defined as a second direction Y. Further, the direction orthogonal to the one surface 4a of the stage 4 is defined as a third direction Z.

A vacuum pump (not illustrated) is connected to the processing chamber 2. The inside of the processing chamber 2 is kept in a vacuum by evacuating the air in the processing chamber 2 using the vacuum pump. The build box 3, the stage 4, the stage drive mechanism 5, the support base 6, the powder supply mechanism 7, and the powder tank 9 are arranged in the processing chamber 2. The electron gun 8 is attached to one end portion side of the processing chamber 2 in the third direction Z, that is, to the upper portion of the processing chamber 2. Further, the build box 3 supported by the support base 6 is arranged at a position facing the electron gun 8 in the third direction Z.

The build box 3 has a cylindrical portion 3a and a flange portion 3b. The axial direction of the cylindrical portion 3a is parallel to the third direction Z, and both end portions of the cylindrical portion 3a in the third direction Z are open. A powder material M1 supplied by the powder supply mechanism 7 and a product formed by the powder material M1 are housed in a cylinder hole of the cylindrical portion 3a.

The flange portion 3b is provided on the outer edge portion of the upper end portion of the cylindrical portion 3a on the one end portion side in the third direction Z. The flange portion 3b is bent substantially perpendicularly from the outer edge portion of the cylindrical portion 3a. The flange portion 3b is arranged in parallel with the first direction X and the second direction Y.

The flange portion 3b is supported by the support base 6 that is arranged in the processing chamber 2. Consequently, in the build box 3, one end portion in the axial direction of the cylindrical portion 3a, that is, the upper end portion side is a fixed end, and the other end portion in the axial direction of the cylindrical portion 3a, that is, the lower end portion side is a free end.

Further, the powder tank 9 that stores the powder material M1 is arranged at both end portions of the flange portion 3b in the first direction X. The powder tank 9 is arranged on one end portion side of the flange portion 3b in the third direction Z, that is, above the flange portion 3b. A fixed-amount supply unit 9a that discharges a predetermined amount of the powder material M1 is arranged on the side of the powder tank 9 that faces the flange portion 3b. A predetermined amount of the powder material M1 is supplied from the fixed-amount supply unit 9a toward the flange portion 3b.

Further, the powder supply mechanism 7 is arranged between the powder tank 9 and the flange portion 3b. The powder supply mechanism 7 has an arm portion 41, a leveling plate 42, and a guide portion 44.

The arm portion 41 is formed of an elongated member with a predetermined length. One longitudinal end portion of the arm portion 41 is movably supported by the guide portion 44. The guide portion 44 is arranged along the first direction X.

The arm portion 41 is supported by the guide portion 44, and its longitudinal direction extends parallel to the second direction Y. The length of the arm portion 41 in the longitudinal direction is set to be at least longer than the length from one end portion to the other end portion of the stage 4 in the second direction Y. Consequently, the arm portion 41 extends from the one end portion to the other end portion of the stage 4 in the second direction Y. The leveling plate 42 is provided at the other end portion of the arm portion 41 in the third direction Z, that is, at the end portion on the side facing the stage 4 and the base plate 10.

The leveling plate 42 is formed in a substantially flat plate shape. Similar to the arm portion 41, the longitudinal direction of the leveling plate 42 extends parallel to the second direction Y. As the arm portion 41 and the leveling plate 42 move along the first direction X by the guide portion 44, the powder material M1 is supplied to the one surface 10*a* of the base plate 10, and is leveled flat at a predetermined height in the third direction Z. As a result, a powder layer made of the powder material M1 is formed on the one surface 10*a* of the base plate 10.

The stage 4 is arranged in the cylinder hole of the cylindrical portion 3*a* of the build box 3 so as to be slidable along the third direction Z. The stage 4 is formed in a substantially flat plate shape. A plurality of support columns 11 that support the base plate 10 are arranged on the one surface 4*a* on the one end portion side of the stage 4 in the third direction Z. The powder material M1 is laminated on the base plate 10. The detailed configuration of the base plate 10 and the support column 11 will be described later.

Further, a sliding member 14 with heat resistance and flexibility is provided at the side end portion of the stage 4. The sliding member 14 is slidably in contact with an inner wall surface 3*c* of the cylindrical portion 3*a*.

Furthermore, a shaft portion 4*b* is provided on the other surface of the stage 4 opposite to the one surface 4*a*. The shaft portion 4*b* projects from the other surface of the stage 4 toward the other side in the third direction Z. The shaft portion 4*b* is connected to the stage drive mechanism 5 that is arranged on the other end portion side of the build box 3 in the third direction Z.

The stage drive mechanism 5 that indicates a movement mechanism supports the stage 4 so as to be movable along the third direction Z via the shaft portion 4*b*. As the stage drive mechanism 5, for example, a drive unit that drives the shaft portion 4*b* such as a rack and a pinion or a ball screw is applied.

The one surface 10*a* of the base plate 10 mounted on the stage 4 faces the electron gun 8 attached to the processing chamber 2. The electron gun 8 that indicates an example of a heating mechanism emits an electron beam L1 to the powder material M1 according to a two-dimensional shape obtained by slicing a design product prepared in advance (a product represented by three-dimensional CAD (Computer-Aided Design) data) at predetermined intervals. The electron beam L1 emitted from the electron gun 8 melts the powder material M1 in a region corresponding to the two-dimensional shape.

1-2. Configuration Around Base Plate and Support Column

Next, a detailed configuration around the base plate 10 and the support column 11 will be described with reference to FIGS. 1 to 6.

Figure 2:
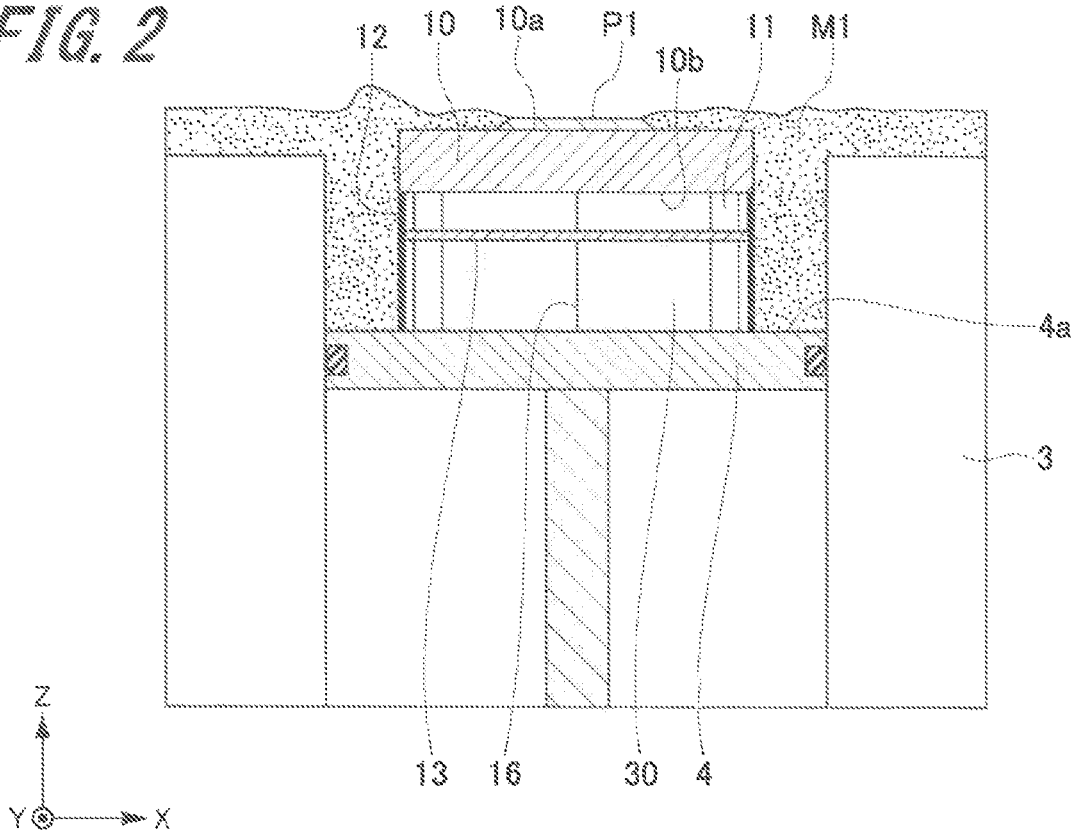
FIG. 2 is a schematic cross-sectional view illustrating a base plate and a stage of the three-dimensional PBF-AM apparatus according to the embodiment example of the present invention.
Figure 3:
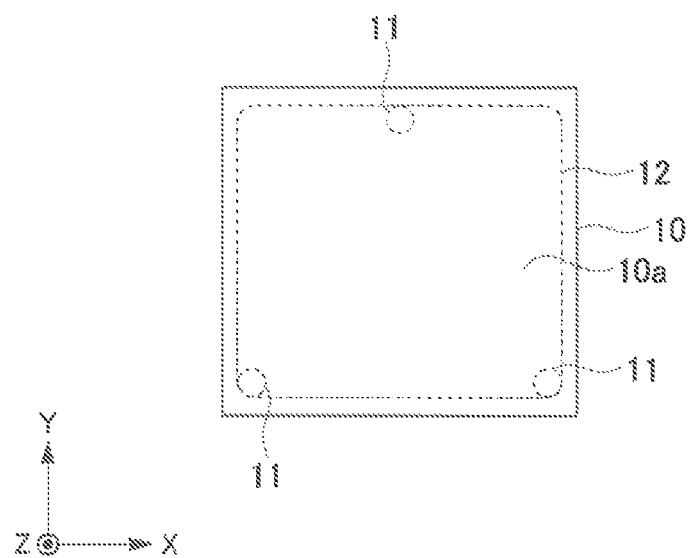
FIG. 3 is a plan view of the base plate of the three-dimensional PBF-AM apparatus according to the embodiment example of the present invention, as seen from above.
Figure 4:
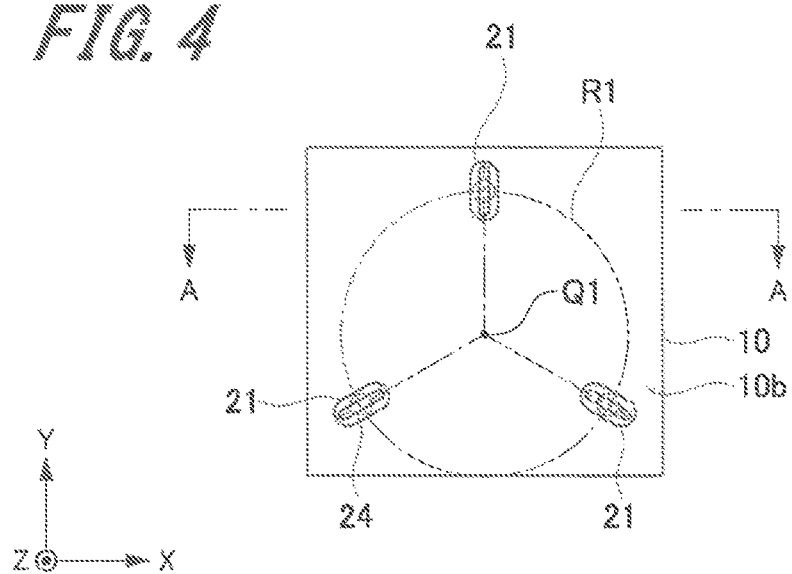
FIG. 4 is a plan view of the base plate of the three-dimensional PBF-AM apparatus according to the embodiment example of the present invention, as seen from below.

FIG. 2 is a schematic configuration diagram illustrating the base plate 10 and the stage 4, and FIG. 3 is a plan view of the base plate as seen from above. FIG. 4 is a plan view of the base plate as seen from below.

As illustrated in FIG. 2, the support column 11 is provided upright from the one surface 4*a* of the stage 4 along the third direction Z. Further, the support column 11 is formed so as to be expandable and contractible along the third direction Z. As illustrated in FIG. 3, in the three-dimensional PBF-AM apparatus 1 of the present example, three support columns 11 are arranged. The base plate 10 is arranged at one end portion of the support column 11 in the third direction Z, that is, at the upper end portion in the vertical direction.

The present example describes an example in which the base plate 10 is supported by three support columns 11, but the present invention is not limited to this, and the base plate 10 may be supported by four support columns 11. However, in a case where the number of the support columns 11 is four, only three support columns 11 of the four support columns 11 are in contact with the base plate 10, and the remaining one support column 11 may be arranged away from the base plate 10. As a result, the base plate 10 may rattle after adjustment or during a manufacturing process.

For this reason, the number of the support columns 11 that support the base plate 10 is preferably three, which is the minimum number required to support the base plate 10. Consequently, since all the support columns 11 support the base plate 10, it is possible to prevent the base plate 10 from rattling after the inclination of the base plate 10 is adjusted.

Further, the shielding member 12 is arranged between the stage 4 and the base plate 10. The shielding member 12 is formed in a cylindrical shape. The shielding member 12 surrounds a plurality of the support columns 11 in the first direction X and the second direction Y. As the shielding member 12 surrounds the support columns 11, it is possible to prevent the powder material M1 and a temporary sintered body M2 (see FIG. 7) in which the powder material M1 is slightly melted from entering the periphery of the support columns 11.

A space 30 in which the powder material M1 and the temporary sintered body M2 are not present is formed between the base plate 10 and the stage 4 by the shielding member 12. As the space 30 is formed, it is possible to suppress the heat transfer from the base plate 10 to the stage 4. Further, it is possible to save the amount of the powder material M1 corresponding to the volume of the shielding member 12, that is, the volume of the space 30.

Here, if the shielding member 12 is not provided, in order to prevent the powder material M1 from entering the periphery of the support columns 11, it is necessary to reduce the length of the support column 11 in the third direction Z in consideration of the angle of repose of the powder material M1. As a result, the base plate 10 becomes close to the stage 4, and the heat of the base plate 10 is easily transferred to the stage 4.

On the other hand, in the three-dimensional PBF-AM apparatus 1 of the present example, since the powder material M1 is blocked by the shielding member 12, it is not necessary to set the length of the support column 11 in view of the angle of repose of the powder material M1. Consequently, the length of the support column 11 in the third direction Z can be increased, and the distance between the base plate 10 and the stage 4 can also be increased. As a result, the heat of the base plate 10 can be made difficult to be transferred to the stage 4.

The length of the support column 11 in the third direction Z is preferably set to be equal to or longer than the length at which the temporary sintered body M2 is not formed on the stage 4 and the powder material M1 is present between the temporary sintered body M2 and the stage 4 without melting.

Further, in order to suppress the heat transfer to the stage 4 through the shielding member 12, a material that has a high melting point and low thermal conductivity is preferable as the shielding member 12, and for example, SUS is applied. Moreover, by forming the shielding member 12 thin, it is possible to suppress the heat transfer through the shielding member 12. For this reason, the shielding member 12 is preferably formed of a foil-like member.

Moreover, a heat shield plate 13 is attached to a plurality of the support columns 11. The heat shield plate 13 is arranged between the base plate 10 and the stage 4. The heat shield plate 13 faces the one surface 4a of the stage 4 and a bottom surface 10b being opposite to one surface 10a of the base plate 10. The heat shield plate 13 reflects heat radiation from the base plate 10 toward the stage 4 to the base plate 10. This makes it possible to prevent the stage 4 from being heated by the heat radiation of the base plate 10.

The base plate 10 is formed in a flat plate shape that is a substantially rectangle. The powder material M1 is laminated on the one surface 10a of the base plate 10. Further, a thermocouple 16 is connected to the bottom surface 10b of the base plate 10 and is arranged in the space 30. As a result, it is possible to prevent the powder material M1 and the temporary sintered body M2 from adhering to the thermocouple 16, and it is also possible to prevent the thermocouple 16 from being damaged.

As illustrated in FIG. 4, three support grooves 21 are formed in the bottom surface 10b of the base plate 10. These three support grooves 21 are arranged at equal intervals in the circumferential direction of a virtual circle R1. A center Q1 of the virtual circle R1 is located on the center of gravity of the base plate 10. The support groove 21 is also a groove portion that extends radially from the center Q1.

Figure 5:
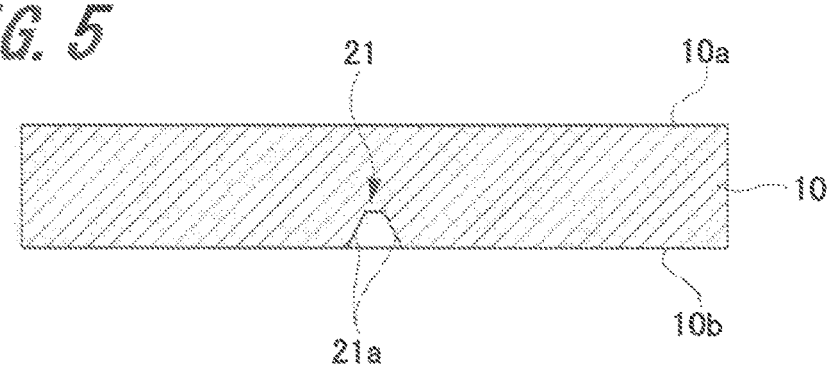
FIG. 5 is a cross-sectional view of the base plate of the three-dimensional PBF-AM apparatus according to the embodiment example of the present invention, taken along a line A-A of FIG. 4.
Figure 6:
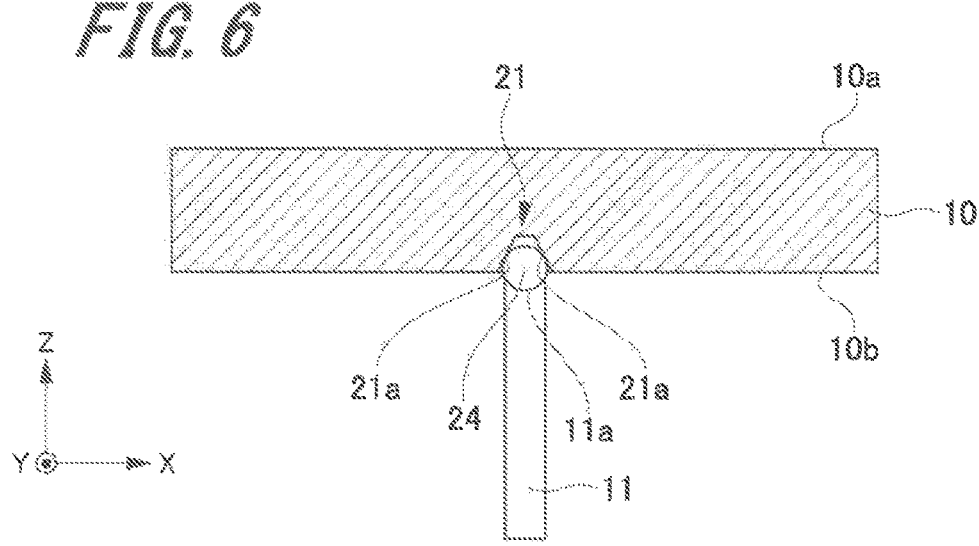
FIG. 6 is a cross-sectional view of the base plate and a support column of the three-dimensional PBF-AM apparatus according to the embodiment example of the present invention, taken along the line A-A of FIG. 4.

FIG. 5 is a cross-sectional view of the base plate 10 taken along a line A-A of FIG. 4, and FIG. 6 is a cross-sectional view of the base plate 10 and the support column 11 taken along the line A-A of FIG. 4.

As illustrated in FIG. 5, the support groove 21 is a recess that is recessed in a substantially trapezoidal shape from the bottom surface 10b of the base plate 10 toward the one surface 10a. The top of the support groove 21 on the side of the one surface 10a extends radially from the center Q1. Further, two inclined surface portions 21a and 21a are formed in the support groove 21 on the side of the bottom surface 10b.

The present example describes an example in which the support groove 21 is formed as a substantially trapezoidal recess, but the present invention is not limited to this, and the support groove 21 may be formed as a recess obtained by recessing the support groove 21 in a V-shape.

As illustrated in FIGS. 4 and 6, a support 24 is fitted into the support groove 21. The support 24 is formed in a spherical shape. The support 24 is arranged on a mounting portion 11a provided at the upper end portion of the support column 11 in the third direction Z. The mounting portion 11a is a substantially hemispherical recess. The base plate 10 is supported by the support 24 and the support column 11. The support column 11 and the support 24 are formed of a metal member.

As illustrated in FIG. 6, the support 24 is in point contact with two inclined surface portions 21a and 21a of the support groove 21. Consequently, the thermal resistance can be increased as compared with a case where the support column 11 and the base plate 10 are in surface contact with each other. As a result, it is possible to suppress the heat transfer from the base plate 10 to the stage 4 through the support column 11.

As the support 24 is in point contact with two inclined surface portions 21a and 21a of the support 24, the gap between the base plate 10 and the support column 11 can be eliminated, and the movement of the support 24 in a direction that the two inclined surface portions 21a and 21a face each other is restricted. As a result, it is possible to prevent the base plate 10 from rattling in the first direction X and the second direction Y after the base plate 10 is mounted on the support 24 and the support column 11.

Further, when the base plate 10 is heated, the base plate 10 is thermally expanded. For this reason, in a conventional three-dimensional PBF-AM apparatus, when the base plate 10 is thermally expanded, the position of the center Q1 of the base plate 10 changes, and the manufacturing accuracy is lowered.

On the other hand, in the base plate 10 of the present example, when the base plate 10 is thermally expanded in the first direction X and the second direction Y, each of the three support grooves 21 slides on the support 24. Further, since the three support grooves 21 are arranged at equal intervals in the circumferential direction of the base plate 10 and the top of the support groove 21 is formed radially with respect to the center Q1, the base plate 10 expands equally from the center (the center of gravity) Q1 in the first direction X and the second direction Y. As a result, it is possible to prevent the position of the center Q1 of the base plate 10 from changing due to thermal expansion of the base plate 10, and it is possible to improve the manufacturing accuracy.

In the three-dimensional PBF-AM apparatus 1 of the present example, an example in which the base plate 10 is formed in a rectangular shape is described, but the present invention is not limited to this, and the base plate 10 may have various other shapes such as a polygonal shape and a circular shape.

2. Operation of Three-Dimensional PBF-AM Apparatus

Next, an operation of the three-dimensional PBF-AM apparatus 1 with the configuration described above will be described.

2-1. Operation of Setting Base Plate and Manufacturing Operation

First, an operation of setting the base plate 10 and a manufacturing operation of manufacturing a product P1 will be described.

In the operation of setting the base plate 10, three support columns 11 are expanded and contracted to adjust the height of the support columns 11 so that the one surface 10a of the base plate 10 is parallel to the first direction X and the second direction Y, that is, the horizontal direction. Next, the shielding member 12 is arranged around the three support columns 11, and the support 24 is mounted on the mounting portion 11a of the support column 11 whose height has been adjusted. The base plate 10 is then mounted on the support 24. The thermocouple 16 is connected to the bottom surface 10b of the base plate 10.

As illustrated in FIG. 1, the space between the shielding member 12 and the inner wall surface 3c of the cylindrical portion 3a of the build box 3 is filled with the powder material M1. In this way, the operation of setting the base plate 10 is completed.

Since the support column 11 and the support 24 are formed of a metal member, the base plate 10 can be electrically grounded via the support column 11 and the support 24 only by mounting the base plate 10 on the support 24 and the support column 11. As a result, it is not necessary to ground the base plate 10 using a ground wire, and thus an operation of grounding the base plate 10 can be easily performed. If the support 24 is formed of an insulator such as ceramics in view of heat resistance, the stage 4 and the base plate 10 may be connected with a conductive wire.

Next, the stage drive mechanism 5 is driven to arrange the stage 4 at a position lowered from the upper surface of the flange portion 3b of the build box 3 by a predetermined interval in the third direction Z, or at a position where the one surface 10a of the base plate 10 is flush with the upper surface of the flange portion 3b. This predetermined interval corresponds to the layer thickness of the powder material M that is spread later in the third direction Z.

Next, the powder supply mechanism 7 is driven, and the arm portion 41 moves along the first direction X. The leveling plate 42 provided on the arm portion 41 thus moves along the guide portion 44 and transports the powder material M1 discharged from the powder tank 9 to the one surface 10a of the base plate 10. As a result, a layer of the powder material M1 is formed on the one surface 10a of the base plate by the leveling plate 42.

Next, the electron gun 8 irradiates the layer of the powder material M1 with the electron beam L1 according to a two-dimensional shape obtained by slicing a design product prepared in advance at predetermined thickness intervals. The electron beam L1 emitted from the electron gun 8 melts the powder material M1 corresponding to the two-dimensional shape. The powder material M1 melted solidifies to become the product P1.

After a layer of the powder material M1 is melted and solidified, the stage 4 is lowered by a predetermined height by the stage drive mechanism 5. Next, the powder material M1 is spread on the most recently spread layer (the lower layer). The powder material M1 in the region corresponding to the two-dimensional shape of the layer is irradiated with the electron beam L1 to melt and solidify the powder material M1. By repeating this series of processes and stacking layers of the powder material M1 melted and solidified, the product P1 is constructed in the cylindrical portion 3a of the build box 3.

As described above, the three-dimensional PBF-AM apparatus 1 of the present example is configured that the heat of the base plate 10 is difficult to be transferred to the stage 4. It is thus possible to prevent the stage 4 from being heated by the heat from the base plate 10 and being thermally deformed when the product P1 is constructed.

Further, since the support 24 is in point contact with the two inclined surface portions 21a and 21a of the support groove 21, it is possible to prevent the base plate 10 and the support column 11 from rattling in the first direction X and the second direction Y. Furthermore, since the position of the center Q1 of the base plate 10 does not change by thermal expansion as described above, the positional relationship between the base plate 10 and the electron gun 8 can be kept at a desired position. As a result, the manufacturing accuracy of the product P1 to be constructed can be improved.

2-2. Operation of Taking Out Product

Next, an operation of taking out the product P1 will be described with reference to FIGS. 7 to 10.

FIGS. 7 to 10 are explanatory views illustrating the operation of taking out the product P1.

Figure 7:
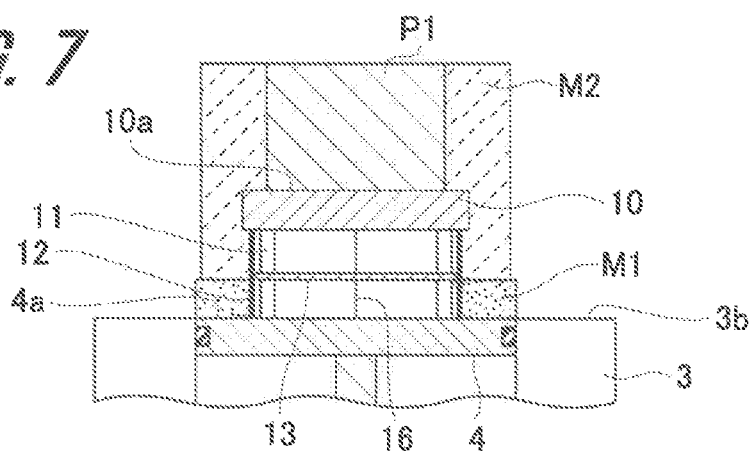
FIG. 7 is an explanatory view illustrating an operation of taking out a product in the three-dimensional PBF-AM apparatus according to the embodiment example of the present invention.

First, as illustrated in FIG. 7, the stage drive mechanism 5 (see FIG. 1) is driven to raise the stage 4 to a position where the one surface 4a of the stage 4 is flush with the flange portion 3b of the build box 3. As a result, the product P1 is discharged from the build box 3.

Figure 8:
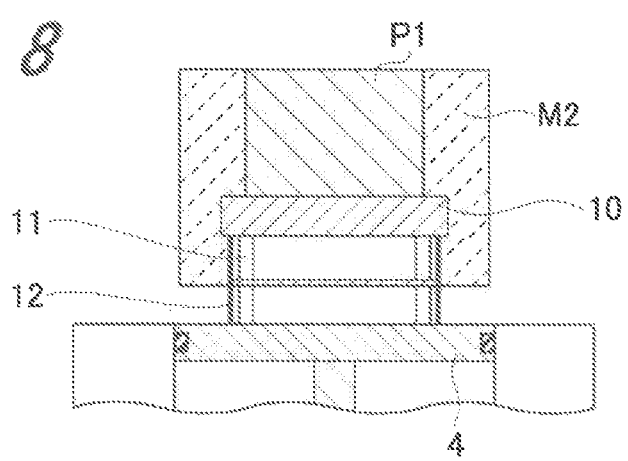
FIG. 8 is an explanatory view illustrating the operation of taking out a product in the three-dimensional PBF-AM apparatus according to the embodiment example of the present invention.
Figure 9:
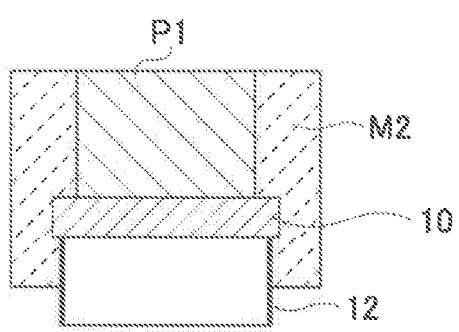
FIG. 9 is an explanatory view illustrating the operation of taking out a product in the three-dimensional PBF-AM apparatus according to the embodiment example of the present invention.

At this time, the temporary sintered body M2 is arranged around the product P1, and the powder material M1 is arranged below the base plate 10. Next, as illustrated in FIG. 8, the powder material M1 that is present under the temporary sintered body M2 is removed. As illustrated in FIG. 9, the product P1, the temporary sintered body M2, the base plate 10, and the shielding member 12 are then removed from the stage 4.

Here, in the conventional three-dimensional PBF-AM apparatus, the temporary sintered body M2 adheres to the support column 11, and thus it is necessary to remove the temporary sintered body M2. Further, when the temporary sintered body M2 is removed from the support column 11, the height of the support column 11 may change, and thus it is necessary to adjust the height of the support column 11 each time the base plate 10 is set. Furthermore, in the conventional three-dimensional PBF-AM apparatus, the support column 11 may be damaged when the temporary sintered body M2 is removed from the support column 11.

On the other hand, in the three-dimensional PBF-AM apparatus 1 of the present example, since the support columns 11 is surrounded by the shielding member 12, the powder material M1 and the temporary sintered body M2 do not adhere to the support columns 11. As a result, it is not necessary to perform an operation of removing the temporary sintered body M2 and the powder material M1 from the support columns 11, and the operation of taking out the product P1 can be easily performed.

Moreover, since the temporary sintered body M2 and the powder material M1 do not come into contact with the support column 11 after the height adjustment is performed, the height of the support column 11 does not change. As a result, once the height of the support column 11 is adjusted, it is not necessary to perform an operation of adjusting the height of the support column 11, and the next operation of setting the base plate 10 can be easily performed.

Figure 10:
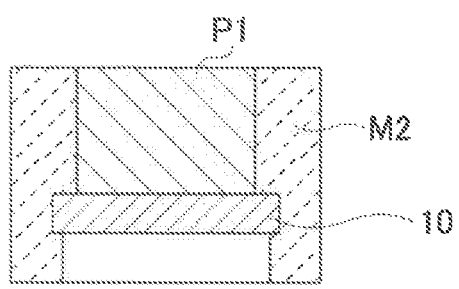
FIG. 10 is an explanatory view illustrating the operation of taking out a product in the three-dimensional PBF-AM apparatus according to the embodiment example of the present invention.

Next, as illustrated in FIG. 10, the shielding member 12 is removed from the product P1, the temporary sintered body M2, and the base plate 10. The product P1 and the temporary sintered body M2 are then blasted to remove the temporary sintered body M2. In this way, the operation of taking out the product P1 is completed.

The thermocouple 16 connected to the bottom surface 10b of the base plate 10 is removed from the base plate 10 when the base plate 10 is removed from the stage 4. Further, since the powder material M1 and the temporary sintered body M2 do not adhere to the thermocouple 16 as in the support column 11, the thermocouple 16 can be easily removed from the base plate 10.

2-3. Modification of Take-Out Operation

Next, a modification of the operation of taking the product P1 will be described with reference to FIGS. 11 to 15.

FIGS. 11 to 15 are explanatory views illustrating the operation of taking out the product P1. In the take-out operation according to the modification, an example of taking out the product P1 by using a chuck member 101 will be described.

Figure 11:
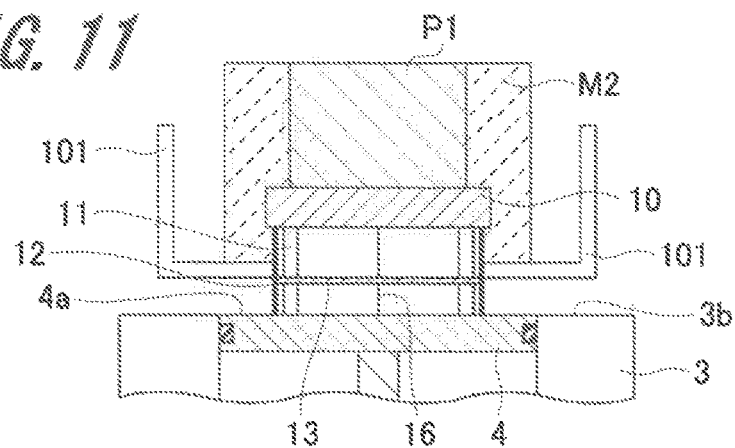
FIG. 11 is an explanatory view illustrating a modification of the operation of taking out a product in the three-dimensional PBF-AM apparatus according to the embodiment example of the present invention.

First, the stage 4 is raised to a position where the one surface 4a of the stage 4 is flush with the flange portion 3b of the build box 3. As a result, the product P1 is discharged from the build box 3. The powder material M1 that is present under the temporary sintered body M2 is then removed. Next, as illustrated in FIG. 11, the chuck member 101 is inserted under the temporary sintered body M2.

Here, when the base plate 10 is supported by four support columns 11, the support columns 11 are normally arranged at the four corners of the base plate 10. For this reason, when the chuck member 101 is inserted, the chuck member 101 may interfere with the support columns 11. On the other hand, in the three-dimensional PBF-AM apparatus 1 of the present example, the base plate 10 is supported by three support columns 11. For this reason, the support columns 11 can be arranged at positions other than the four corners of the base plate 10. As a result, it is possible to prevent the chuck member 101 and the support column 11 from interfering with each other.

Further, in the three-dimensional PBF-AM apparatus 1 of the present example, the length of the support column 11 can be increased, so that a space for inserting the chuck member 101 can be secured under the temporary sintered body M2. This makes it possible to prevent the chuck member 101 from interfering with the support column 11 and the base plate 10 when the chuck member 101 is inserted.

Figure 12:
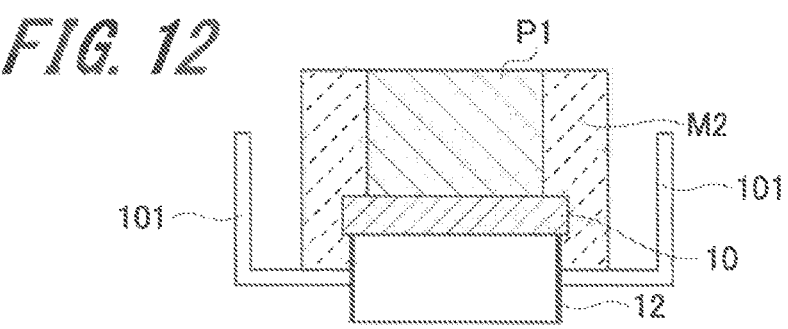
FIG. 12 is an explanatory view illustrating the modification of the operation of taking out a product in the three-dimensional PBF-AM apparatus according to the embodiment example of the present invention.
Figure 13:
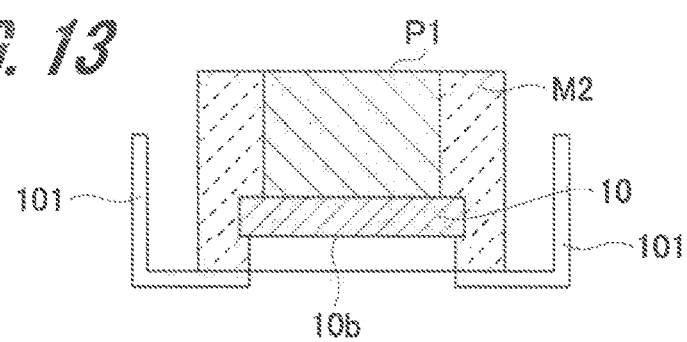
FIG. 13 is an explanatory view illustrating the modification of the operation of taking out a product in the three-dimensional PBF-AM apparatus according to the embodiment example of the present invention.

Next, as illustrated in FIG. 12, the product P1, the temporary sintered body M2, the base plate 10, and the shielding member 12 are removed from the stage 4 using the chuck member 101, and as illustrated in FIG. 13, the shielding member 12 is removed from the product P1, the temporary sintered body M2, and the base plate 10.

Figure 14:
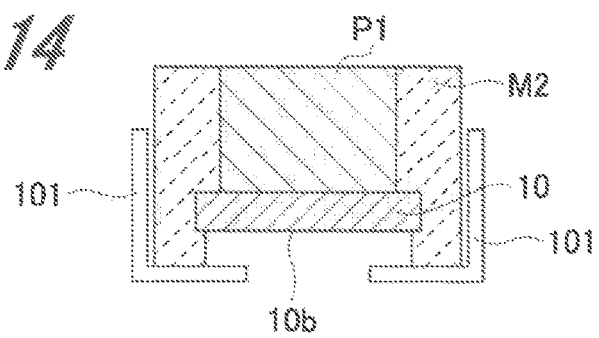
FIG. 14 is an explanatory view illustrating the modification of the operation of taking out a product in the three-dimensional PBF-AM apparatus according to the embodiment example of the present invention.
Figure 15:
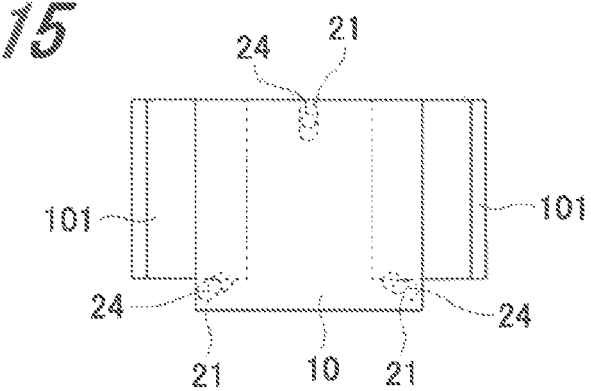
FIG. 15 is an explanatory view illustrating the modification of the operation of taking out a product in the three-dimensional PBF-AM apparatus according to the embodiment example of the present invention.

As illustrated in FIGS. 14 and 15, the chuck member 101 is inserted to a position where the chuck member 101 faces the bottom surface 10b of the base plate 10. As a result, the chuck member 101 can reliably hold the product P1, the temporary sintered body M2, and the base plate 10. Next, the product P1 and the temporary sintered body M2 are blasted to remove the temporary sintered body M2. In this way, the operation of taking out the product P1 using the chuck member 101 is completed. As a result, even if the product P1, the temporary sintered body M2, and the base plate 10 are too heavy to be carried by human hands, these members can be easily taken out by using the chuck member 101.

3. Modification

Next, a modification of the three-dimensional PBF-AM apparatus will be described with reference to FIGS. 16 to 19.

3-1. Modification of Support Structure

First, a modification of a support structure of the base plate will be described with reference to FIG. 16.

Figure 16:
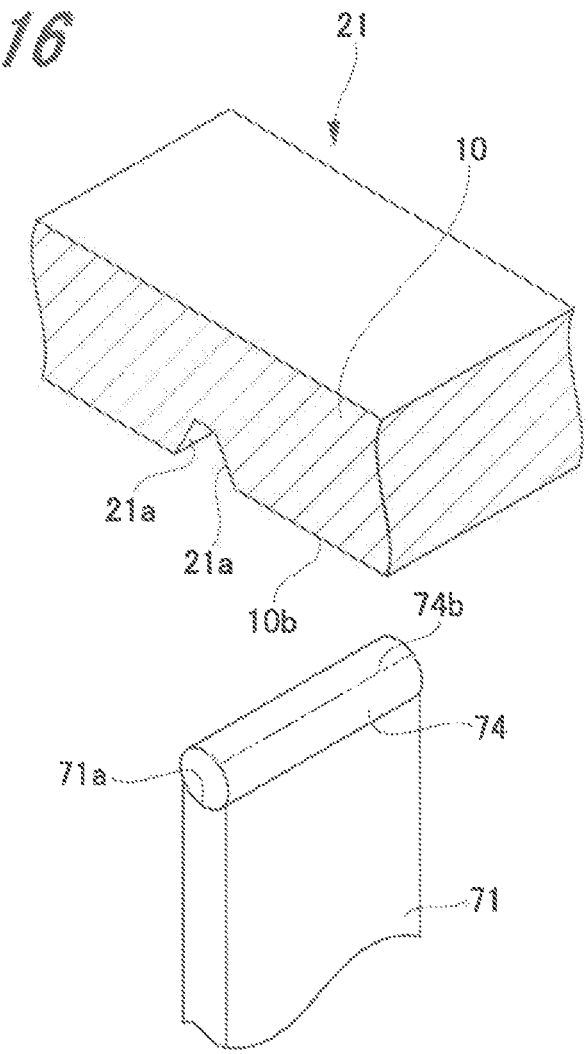
FIG. 16 is a perspective view illustrating a modification of the base plate and the support column of the three-dimensional PBF-AM apparatus according to the embodiment example of the present invention.

FIG. 16 is a perspective view illustrating a modification of the base plate and the support column.

In the embodiment example described above, as illustrated in FIG. 6, an example in which the support 24 provided on the support column 11 is formed in a spherical shape, and the support 24 and the support groove 21 are in point contact with each other has been described, but the present invention is not limited to this. For example, the support and the support groove may be in line contact with each other. As illustrated in FIG. 16, a support column 71 includes a mounting portion 71a extending with a predetermined length. The mounting portion 71a is a recess that is recessed in a substantially semicircular shape. A support 74 is mounted on the mounting portion 71a.

The support 74 is formed in a substantially columnar shape. The support 74 is then fitted into the support groove 21 formed in the base plate 10. Further, an outer circumferential surface 74b of the support 74 makes line contact with two inclined surface portions 21a and 21a of the support groove 21.

Even with the support structure of the base plate 10 as illustrated in FIG. 16, the thermal resistance can be increased as compared with the case where the support column 11 and the base plate 10 are in surface contact, and it is possible to suppress the heat transfer from the base plate 10 to the stage 4 through the support column 71.

3-2. Modification of Shielding Member

Next, a modification of the shielding member will be described with reference to FIGS. 17 to 19.

Figure 17:
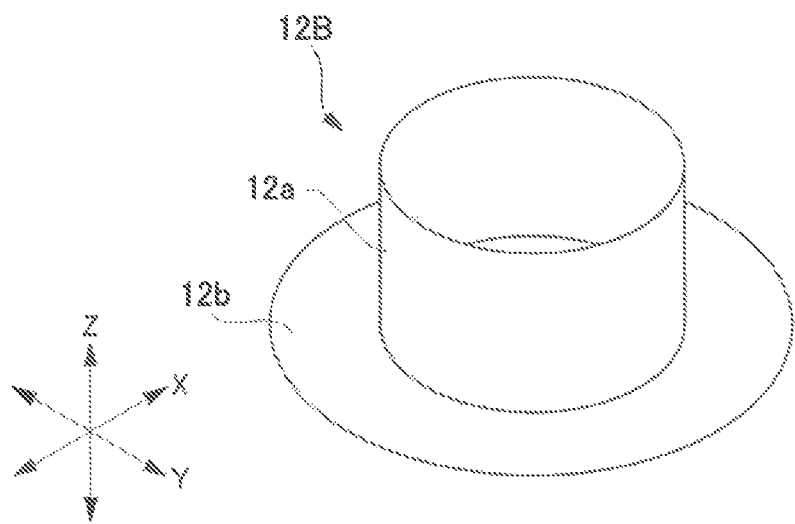
FIG. 17 is a perspective view illustrating a modification of a shielding member of the three-dimensional PBF-AM apparatus according to the embodiment example of the present invention.
Figure 18:
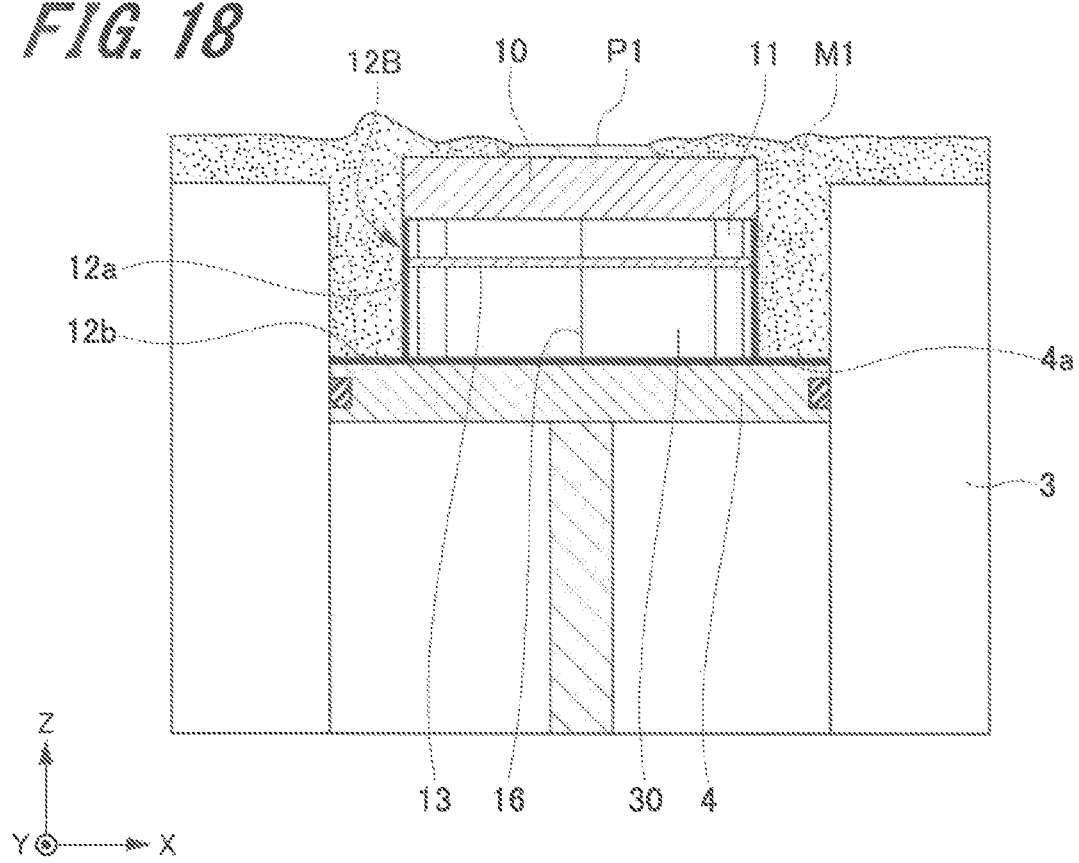
FIG. 18 is a cross-sectional view illustrating a state where the shielding member according to the modification is mounted on the stage.

FIG. 17 is a perspective view illustrating a modification of the shielding member. FIG. 18 is a cross-sectional view illustrating a state where the shielding member according to the modification is mounted on the stage 4.

As illustrated in FIG. 17, a shielding member 12B according to the modification has a shielding portion 12a that has a hollow substantially cylindrical shape and a bottom surface portion 12b that has a flat plate shape. As illustrated in FIG. 18, the shielding portion 12a is arranged between the stage 4 and the base plate 10, and surrounds a plurality of the support columns 11 in the first direction X and the second direction Y.

The bottom surface portion 12b is formed on the lower end portion of the shielding portion 12a in the vertical direction, that is, on the other end portion side in the third direction Z. In addition, the bottom surface portion 12b projects radially outward from the side surface portion of the shielding portion 12a. As illustrated in FIG. 18, the bottom surface portion 12b is mounted on the one surface 4a of the stage 4.

As described above, in the shielding member 12B according to the modification, the bottom surface portion 12b can prevent the powder material M1 and the temporary sintered body M2 in which the powder material M1 is slightly melted from entering the space 30 from the lower end portion of the shielding portion 12a. As a result, the powder material M1 can be saved by using the shielding member 12B according to the modification.

Figure 19:
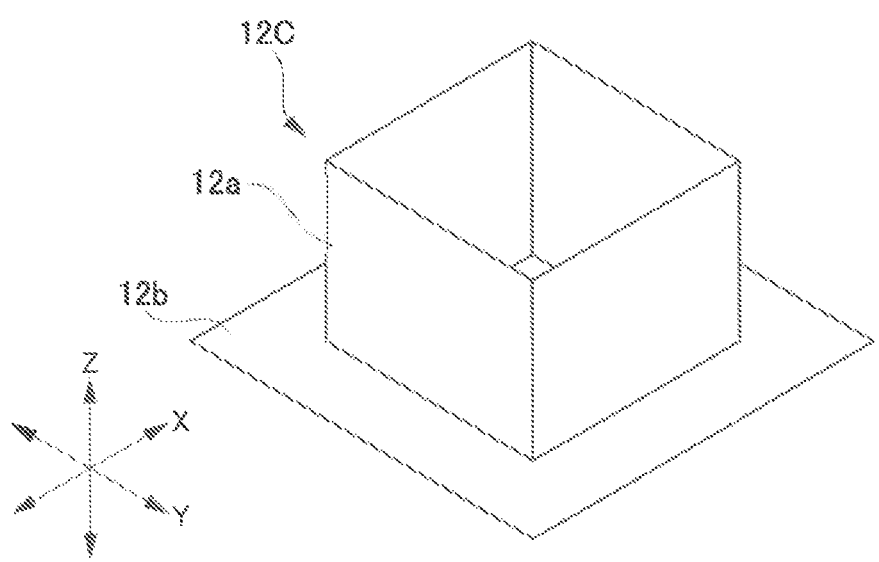
FIG. 19 is a perspective view illustrating another modification of the shielding member of the three-dimensional PBF-AM apparatus according to the embodiment example of the present invention.

FIG. 19 is a perspective view illustrating another modification of the shielding member.

The shape of the shielding member is not limited to a columnar shape illustrated in FIG. 17. For example, as in a shielding member 12C illustrated in FIG. 19, the shielding portion 12a may be formed in a hollow prismatic shape. Also in the shielding member 12C according to another modification illustrated in FIG. 19, the bottom surface portion 12b that projects outward from the other end portion in the third direction Z, which is the lower end portion of the shielding portion 12a, may be provided.

The present invention is not limited to the embodiments described above and illustrated in the drawings, and various modifications can be made without departing from the gist of the invention described in the claims.

For example, the above embodiment example has described an example in which the metal powder such as titanium, aluminum, or iron is applied as a powder material, but the present invention is not limited to this, and a resin or the like is used as the powder material. Further, an example in which the electron gun that irradiates an electron beam is applied as the heating mechanism that preheats or melts a powder material has been described, but the present invention is not limited to this. As the heating mechanism, for example, a laser irradiation unit that irradiates a laser may be applied.

Although words such as "parallel" and "orthogonal" have been used in the present specification, these words do not mean only strict "parallel" and "orthogonal", but include states of "substantially parallel" and "substantially orthogonal" that include "parallel" and "orthogonal", and fall within a range in which functions can be achieved.

What is claimed is:

1. A three-dimensional powder bed fusion additive manufacturing (PBF-AM) apparatus comprising:
   a movement mechanism;
   a stage that is movably supported by the movement mechanism;

a build box with a cylinder hole in which the stage is arranged so as to be slidable;
a plurality of support columns that are arranged on the stage;
a base plate supported by the plurality of support columns, on which a powder material for forming a product is laminated; and
a shielding member that surrounds the plurality of support columns between the stage and the base plate, and that forms a first space between the stage and the base plate,
wherein a second space between the shielding member and an inner wall surface of the cylinder hole of the build box is filled with the powder material, and
wherein the powder material is blocked by the shielding member, and the powder material is not present in the first space.

2. The three-dimensional PBF-AM apparatus according to claim 1, wherein
a support groove is formed in a bottom surface of the base plate, the bottom surface being opposite to one surface on which the powder material is laminated, and
a support that makes point contact or line contact with the support groove is arranged on each of the plurality of support columns.

3. A three-dimensional PBF-AM apparatus comprising:
a movement mechanism;
a stage that is movably supported by the movement mechanism;
a build box with a cylinder hole in which the stage is arranged so as to be slidable;
a plurality of support columns that are arranged on the stage;
a base plate supported by the plurality of support columns, on which a powder material for forming a product is laminated; and
a shielding member that surrounds the plurality of support columns is arranged between the stage and the base plate, and that forms a first space between the stage and the base plate, wherein
a support groove is formed in a bottom surface of the base plate, the bottom surface being opposite to one surface on which the powder material is laminated,
a support that makes point contact or line contact with the support groove is arranged on each of the plurality of support columns,
a second space between the shielding member and an inner wall surface of the cylinder hole of the build box is filled with the powder material, and
the powder material is blocked by the shielding member, and the powder material is not present in the first space.

4. The three-dimensional PBF-AM apparatus according to claim 2, wherein
the support is formed in a spherical shape.

5. The three-dimensional PBF-AM apparatus according to claim 3, wherein
the support is formed in a spherical shape.

6. The three-dimensional PBF-AM apparatus according to claim 2, wherein
the support groove extends radially from a center that corresponds to a center of gravity of the base plate.

7. The three-dimensional PBF-AM apparatus according to claim 3, wherein
the support groove extends radially from a center that corresponds to a center of gravity of the base plate.

8. The three-dimensional PBF-AM apparatus according to claim 2, wherein
the support groove has two inclined surface portions that make point contact with the support.

9. The three-dimensional PBF-AM apparatus according to claim 3, wherein
the support groove has two inclined surface portions that make point contact with the support.

10. The three-dimensional PBF-AM apparatus according to claim 2, wherein
the support and each of the plurality of support columns are formed of a metal member, and ground the base plate.

11. The three-dimensional PBF-AM apparatus according to claim 3, wherein
the support and each of the plurality of support columns are formed of a metal member, and ground the base plate.

12. The three-dimensional PBF-AM apparatus according to claim 1, wherein
three support columns are arranged.

13. The three-dimensional PBF-AM apparatus according to claim 3, wherein
three support columns are arranged.

14. The three-dimensional PBF-AM apparatus according to claim 1, wherein
a heat shield plate that reflects radiant heat from the base plate back to the base plate is arranged between the base plate and the stage.

15. The three-dimensional PBF-AM apparatus according to claim 3, wherein
a heat shield plate that reflects radiant heat from the base plate back to the base plate is arranged between the base plate and the stage.

16. The three-dimensional PBF-AM apparatus according to claim 1, wherein
the shielding member includes
a shielding portion that surrounds the plurality of support columns, and
a bottom surface portion that projects outward from a lower end portion of the shielding portion, and
the bottom surface portion is mounted on the stage.

17. The three-dimensional PBF-AM apparatus according to claim 3, wherein
the shielding member includes
a shielding portion that surrounds the plurality of support columns, and
a bottom surface portion that projects outward from a lower end portion of the shielding portion, and
the bottom surface portion is mounted on the stage.

* * * * *